United States Patent

Heim et al.

Patent Number: 5,558,916
Date of Patent: Sep. 24, 1996

[54] METHOD FOR MANUFACTURING A CARPET HAVING A SECONDARY BACKING SUBSTANTIALLY IMPERVIOUS TO LIQUIDS AND THE RESULTANT CARPET

[75] Inventors: William W. Heim, Signal Mountain, Tenn.; James K. Hendrix, Woodstock, Ga.; Joyce M. Materniak, Hockessin, Del.; Peter M. Murphy, Ooltewah; Neil A. Panzier, Signal Mountain, both of Tenn.; Yashavant V. Vinod, Hockessin, Del.

[73] Assignee: E. I. Du Pont de Nemours and Company, Wilmington, Del.

[21] Appl. No.: 418,993

[22] Filed: Apr. 6, 1995

Related U.S. Application Data

[63] Continuation of Ser. No. 292,534, Aug. 18, 1994, abandoned, which is a continuation-in-part of Ser. No. 178,992, Jan. 7, 1994, Pat. No. 5,438,785.

[51] Int. Cl.$^6$ .............................. B32B 5/26; B32B 33/00
[52] U.S. Cl. .......................... 428/95; 156/278; 156/280; 156/307.7; 427/359; 427/365; 427/373; 427/393.4; 428/96; 428/252; 428/421; 428/422
[58] Field of Search .................... 427/359, 365, 427/373, 393.4; 156/278, 280, 307.7; 428/95, 96, 252, 421, 422

[56] References Cited

U.S. PATENT DOCUMENTS

| | | | |
|---|---|---|---|
| 4,023,526 | 5/1977 | Ashmuss et al. | 118/410 |
| 4,217,383 | 8/1980 | Patterson et al. | 428/95 |
| 4,305,169 | 12/1981 | Vidalis | 8/149 |
| 4,366,682 | 1/1983 | Keller | 68/200 |
| 4,401,704 | 8/1983 | Zegota | 428/95 |
| 4,453,462 | 6/1984 | Mitter | 101/124 |
| 4,502,304 | 3/1985 | Hopkins | 68/200 |
| 4,503,191 | 3/1985 | Stakelbeck | 524/159 |
| 4,579,762 | 4/1986 | Ucci | 428/95 |
| 4,619,853 | 10/1986 | Blyth et al. | 428/95 |
| 4,643,930 | 2/1987 | Ucci | 428/96 |
| 5,030,497 | 7/1991 | Claessen | 428/95 |
| 5,104,712 | 4/1992 | Walters | 428/95 |
| 5,198,277 | 3/1993 | Hamilton et al. | 428/92 |
| 5,204,155 | 4/1993 | Bell et al. | 428/95 |
| 5,219,620 | 6/1993 | Potter et al. | 427/434.2 |
| 5,283,097 | 2/1994 | Gillyns et al. | 428/91 |
| 5,348,785 | 9/1994 | Vinod | 428/95 |

FOREIGN PATENT DOCUMENTS

| | | |
|---|---|---|
| 2126586 | 5/1971 | Germany. |
| 2942528A1 | 10/1979 | Germany. |
| 1409068 | 7/1972 | United Kingdom. |

*Primary Examiner*—James C. Cannon

[57] ABSTRACT

This invention relates to methods for making a carpet having a secondary backing which is substantially impervious to liquids. The methods involve applying a repellent finish onto the secondary backing material and drying the finish. The finish may be applied as foam to the secondary backing, against the force of gravity, by means of a press roll. This invention also includes the resultant carpets prepared from these methods.

24 Claims, 1 Drawing Sheet

METHOD FOR MANUFACTURING A CARPET HAVING A SECONDARY BACKING SUBSTANTIALLY IMPERVIOUS TO LIQUIDS AND THE RESULTANT CARPET

CROSS REFERENCE TO RELATED APPLICATIONS

This is a continuation of application Ser. No. 08/292,534 filed Aug. 18, 1994, now abandoned which is a continuation-in-part of application Ser. No. 08/178,992 filed Jan. 7, 1994 and now U.S. Pat. No. 5,348,785.

BACKGROUND OF THE INVENTION

1. Field of the Invention

This invention relates to novel methods for making a carpet having a secondary backing which is substantially impervious to liquids. The methods involve applying a repellent finish onto the secondary backing material. The invention also encompasses carpets made from such methods.

2. Description of Related Art

The majority of residential and commercial carpets are constructed in the following general manner. Carpet pile yarn is first inserted through a primary backing fabric to form tufts of yarn projecting from the surface of the fabric. The carpet is then dyed. The primary backing is then coated with a polymeric latex to lock the yarn tufts in place and to provide an adhesive for a secondary backing fabric. The latex-coated primary backing is then bonded to the secondary backing to form a laminated backing structure.

However, one problem with the above-described carpets is their susceptibility to penetration by liquids. For instance, if water, a water-based liquid (soda pop, coffee, urine, etc.), or another type of liquid (e.g., oil-based) is spilled onto the carpet face, it may permeate through the primary and secondary backings and onto the underlying material (carpet underpad, hardwood floors, etc.). The underlying material may become stained and deteriorate over a period of time. Mildew may also grow on the backing and underlying material.

Those skilled in the trade have considered different ways for manufacturing latex-backed carpets in order to reduce the permeability of liquids through the primary backing material.

One method involves applying a fluorochemical or other water-repellent agent onto the face fiber of the carpet during the fiber-forming or carpet-manufacturing process. In such instances, the fluorochemicals serve to reduce the wettability of the fibers in the finished carpet such that a spilled liquid will initially "bead" on the surface of the fiber. However, if the beaded liquid is not promptly removed, it will eventually be absorbed by the fibers and may penetrate through the primary backing.

Another method for making the primary backing impervious to liquids involves mixing fluorochemicals into the latex composition and then coating the primary carpet backing with the fluorochemical-containing latex.

For instance, Ucci, U.S. Pat. No. 4,643,930, discloses a carpet structure having a primary backing tufted with nylon yarns. The yarns are coated with a fluorochemical to improve the soil resistance of the carpet. The underside of the primary backing is coated with a latex containing fluorochemicals mixed therein such that the primary backing is made substantially impervious to water.

Blyth et al., U.S. Pat. No. 4,619,853 also discloses nylon carpets having a primary backing coated with a latex containing fluorochemicals mixed therein. In addition, the nylon yarns are coated with sulfonated phenol or naphthol-formaldehyde condensate to improve the stain resistance of the carpet's surface.

Ucci, U.S. Pat. No. 4,579,762 also discloses nylon carpets having a primary backing which is coated with a fluorochemical-containing latex. In this instance, the nylon yarns are made from a modified nylon polymer containing aromatic sulfonate units to improve the stain-resistance of the carpet's surface.

Although the foregoing methods may be somewhat effective for providing the primary backing with water impermeability properties, such methods may restrict the flexibility of the carpet manufacturing operation. For example, it may not be possible to continuously convert a commercial production unit in order that batches of fluorochemical-containing latex are applied to some primary backings, while batches of standard, non-fluorochemical-containing latex are applied to other primary backings. Additionally, in some instances, stainings on carpets having impervious primary backings may be more visible since the stain will not penetrate into the primary backing but may spread across the face of the carpet. In addition, if such carpets also have a secondary backing, the latex containing the mixed fluorochemicals may reduce the adhesion between the primary and secondary backings, thus reducing the delamination strength and tuft bind of the carpet.

In view of the above disadvantages, it would be desirable to have a method for making the secondary backing of a carpet substantially impervious to liquids, and such a method should also be commercially flexible for manufacturing the carpets. The present invention provides such methods as well as the resultant carpets having a secondary backing substantially impervious to liquids.

SUMMARY OF THE INVENTION

This invention is directed to methods for constructing a carpet having a secondary backing which is substantially impervious to liquids. In one method, the secondary backing is a polypropylene material and is first contacted with a latex-coated primary backing having tufts of polyamide (nylon) yarns. A repellent finish is then applied to the secondary backing in an amount sufficient to render the secondary backing substantially impervious to liquids. The repellent finish is then dried by such techniques as heating the carpet at an oven temperature in the range of 250° to 400° F. Certain repellent finishes may also be effective at room temperature. Another method involves applying the repellent finish onto the secondary backing prior to contacting the primary and secondary backings with each other. In such instances, the repellent finish may first be dried before the secondary backing is laminated to the adhesive-coated primary backing. Alternatively, the repellent finish may still be wet when the secondary backing is laminated to the adhesive-coated primary backing. In both instances, the latex is cured and dried after lamination by heating the carpet at an oven temperature in the range of 250° to 400° F. In another method, the repellent finish may also be applied onto the underside of a finished carpet having a secondary backing. Suitable repellent finishes include fluorochemicals, silicone-based compositions, wax emulsions, naturally occurring oils, and hydrophobic acrylate resins. The repellent finish may typically contain about 0.5 to about 40% by weight active ingredient.

This invention also includes methods for applying a repellent finish onto a secondary backing of a carpet. A carpet comprising a tufted primary backing and a secondary backing is fed facing upwards along a moving carpet line. The repellent finish is introduced as foam through a foam delivery tube to form a bank of foam in the nip area between a rotating lower press roll and the secondary backing of the carpet. The foam is brought into contact with the secondary backing against the force of gravity, but there is no contact between the foam delivery tube and the carpet.

This invention also includes carpets produced from the above-described methods.

BRIEF DESCRIPTION OF THE FIGURES

FIG. 2-B is an enlarged view of the foam system shown in FIG. 1 illustrating the foam delivery tube extending over the lower press roll.

DETAILED DESCRIPTION OF THE INVENTION

The present invention provides a process for constructing a carpet having a primary backing and a secondary backing, wherein a repellent finish is applied to the secondary backing such that the carpet is rendered substantially impervious to liquids. By the phrase, "substantially impervious to liquids" as used herein, it is meant that water, aqueous solutions (e.g., coffee, wine, soda, or fruit juice), or non-aqueous solutions (e.g., mineral oil or alcohol) will not substantially penetrate through the secondary backing in accordance with the testing methods described below.

Generally, the pile yarns for the carpets of this invention may be prepared by conventional techniques. These yarns are composed of multiple filaments which are formed from synthetic or natural polymers, such as wool. Typical synthetic fiber-forming polymers include, for example, polyolefins such as polypropylene, polyamides such as polyhexamethylene adipamide (nylon 6,6) and polycaprolactam (nylon 6), polyesters such as polyethylene terephthalate, and acrylics. Copolymers, terpolymers, and melt blends of such polymers are also suitable.

In a nylon-filament forming process, the molten polymer is extruded through a spinneret into a quenching medium, where the polymer cools and solidifies to form filaments. After drawing, the filaments may be crimped and cut into short lengths to make staple fiber, or bulked to make bulked continuous filaments (BCF). A fluorochemical finish may be applied during the fiber-forming process (producer-applied fluorochemical).

After additional yarn processing steps, the BCF or staple spun yarns may then be tufted into a primary backing fabric by techniques known in the trade. Alternatively, the carpets can be woven or needle-punched. The primary backing may be a woven material made from natural or synthetic materials, such as, jute, wool, rayon, polyamides, polyesters, or polyolefins. Nonwoven backings may also be used. The carpet is then typically dyed, rinsed, and subjected to other standard finishing operations including stain-resist and soil-resist treatment of the yarn tufts.

A latex of a synthetic polymer is then applied to the underside of the primary backing fabric to lock the tufts in place and to provide an adhesive for a secondary backing material. Any suitable adhesive polymeric latex may be used. The latex typically includes a filler material such as calcium carbonate, silica, talc, or clay. Examples of suitable polymers for preparing such latex compositions include styrene/butadiene copolymers, ethylene/vinyl acetate copolymers, polyacrylates, and blends thereof. Generally, the amount of latex applied to the primary backing is in the range of about 18 to 40 ounces per square yard of primary fabric.

Figure 1:
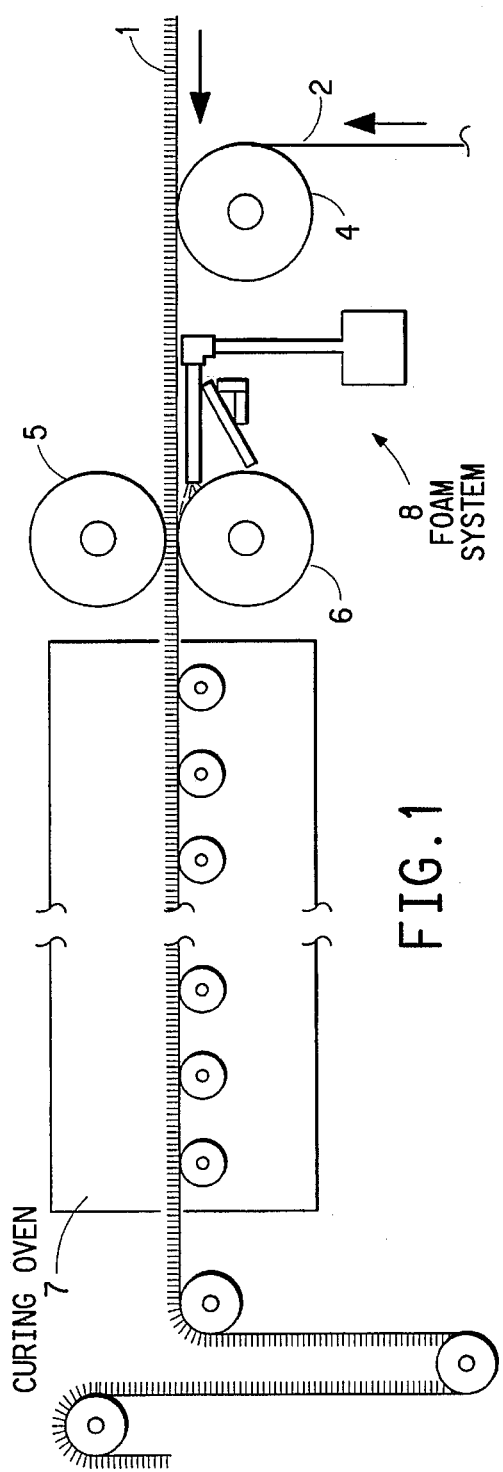
FIG. 1 is a schematic view of a method of the present invention illustrating the foam application of repellent finish to the underside of a secondary backing.

The latex-coated tufted primary backing is then brought in contact with a secondary backing material. Different secondary backing materials known in the trade may be used including jute, woven tapes of polypropylene, plain woven polypropylene fabrics, felts, and thermoplastic polymer films. Often, the upper surface of the secondary backing will also be coated with a small amount of latex to improve the adhesiveness between the latex-coated underside of the primary backing and the secondary backing. Referring to FIG. 1, the contacted primary (1) and secondary (2) backings adhere to each other as the backings pass over the marriage roll (4). The repellent finish may then be applied to the underside of the secondary backing material. By the term "repellent finish" as used herein, it is meant a composition containing repellent chemicals dispersed, suspended, or dissolved in a solvent such as water or alcohol and which will form a film-like barrier on the secondary backing to render the secondary backing substantially impervious to liquids. The finish may also contain surfactants, foaming agents, and other additives. In addition, the finish may also contain a mixture of different repellents. Suitable repellents for use in the finish may be selected from the group consisting of fluorochemicals, silicone-based compositions, wax emulsions, naturally occurring oils, and hydrophobic acrylate resins.

Suitable fluorochemicals generally include, but are not limited to, polymers or compounds with molecular weights of greater than 500 having pendent or end groups of perfluoroalkyl moieties. Examples of some suitable fluorochemicals include polyvinyldiene fluoride, polytetrafluoroethylene, 2-perfluorooctylethyl acrylate and blends of such compounds with polymers of methyl methacrylate, butyl methacrylate, and ethyl methyl acrylate, and modified wax emulsions, and polyvinylidene chloride. Commercially available fluorochemicals such as "TEFLON", "DURATECH", and "ZONYL" from DuPont Co., "MILEASE" from ICI, "ASAHIGARD" from Asahi, "SCOTCHGARD" from 3M, "SOFTECH" from Dyetech, "TEX-TEL" from Atochem, and "NK GUARD" from Nicca, may be used.

Suitable commercially available silicone-based repellents include Dow Corning C2-0563 and Enterprise Siliconized Water Seal. Particularly, the Dow-Corning C2-0563 silicone repellent is a mixture of silicon compounds, hydrocarbon solvents, and titanium esters. The silicon compounds include silanes, cyclic and linear polysiloxanes, and silicone resins.

Suitable commercially available wax emulsions include, for example, "NALAN" GN, "AEROTEX" 96B and , "AUROPEL."

Naturally occurring oils such as canola oil may also be used.

Suitable hydrophobic acrylate resins include water repellent polymers and copolymers of acrylic acid esters and methacrylic acid esters such as methyl, but preferably ethyl and butyl esters. Mixtures of these polymers and copolymers are also effective. One example of a commercially available resin is "Acrylic Matte Medium" from Golden Artist Colors.

The repellent finish may be applied to the secondary backing by various means, including foam, spray, padding, or dipping methods. FIG. 1 illustrates a foam system for applying the repellent finish in the form of foam to the underside of the secondary backing against the force of gravity. After the foam has been applied, the primary and secondary backing materials are passed between upper (5) and lower (6) press rolls, whereby the primary and secondary backing materials are pressed together and laminated. The entire carpet structure is then subjected to heat-treatment in order that the repellent finish may be dried onto the secondary backing. Typically, the carpet structure will be positioned on a tenter frame and passed through a conventional latex curing oven (7), wherein the latex is also dried and cured. Although the heating temperature may vary depending upon the type of pile yarn, latex composition, repellent finish, and backing materials used, the temperature inside the oven should generally be in the range of 250° to 400° F.

The methods and resultant carpets of this invention, as described above for example, offer several advantages over carpets of the prior art. For instance, the primary backing of the carpets in this invention may be permeable to liquids. Thus, any spilled liquids will not excessively spread across the face fiber of the carpet, but will become entrapped between the face fiber and the secondary backing. These spilled liquids may then be removed by vacuuming, sponging, or any other appropriate means. The methods of this invention are also commercially flexible, since the foam and spray application systems for applying the repellent finish may be easily installed at a carpet mill. Also, the delamination strength and tuftbind of the carpets of this invention are not reduced in contrast to carpets containing latex which has been prepared by mixing fluorochemicals into the latex during the manufacturing process. In such carpets, there is often reduced adhesion between the primary and secondary backings due to the premixing of the fluorochemicals and latex.

Alternatively, it is understood that the repellent finish may be applied onto the secondary backing prior to contacting the primary and secondary backings with each other. The primary and secondary backings may then be laminated together after the repellent finish has dried, or while the repellent finish is still wet. After laminating the secondary backing to the latex-coated primary backing, the carpet is passed through an oven where the latex is dried and cured.

It is also recognized that certain repellent finishes may be applied onto the secondary backing after the carpet structure has passed through the latex curing oven. For instance, some fluorochemicals, such as "TEFLON" MF available from DuPont Co., are effective at room temperature. Thus, it is not necessary for such fluorochemicals to be heat-treated in order to impart repellency to the secondary backing. These room temperature-dried fluorochemicals may simply be sprayed onto the secondary backing of the finished carpet. These fluorochemicals are also effective for treating the secondary backings of carpets which do not use latex as the adhesive between the primary and secondary backings. For instance, such fluorochemicals may be used on finished carpets having a primary backing which has been coated with a hot melt adhesive as described in Reith, U.S. Pat. Nos. 4,844,765 and 4,939,036.

In a preferred embodiment, the repellent finish is applied onto the underside of the secondary backing by a foam applicator (8) subsequent to the primary and secondary backings passing over the marriage roll (4) and prior to the backings passing between the upper and lower press rolls (5,6). In such a method, a foamable mixture containing the repellent finish and foaming agents is first prepared by techniques known in the art. Suitable foaming agents include KAF 300S, available from Peach State Labs, Dextrol Foamer 916, available from Dexter Chemicals, Inc., Mykon NRW3 available from Sequa, and Arquad 12–50 or Arquad 12–37 available from Akzo Chemicals.

The foamable mixture can then be generated into foam and applied through a commercial foam generator. It is important that the foam be stable in order that it may be applied uniformly along the secondary backing. Generally, the foam application conditions are adjusted to obtain the desired percentage of repellent finish in the foamable mixture, flow rate of the foamable mixture, speed of the carpet through the oven (dryer speed), and blow ratio (ratio of the volume of air to the volume of foamable mixture).

Figure 2B:
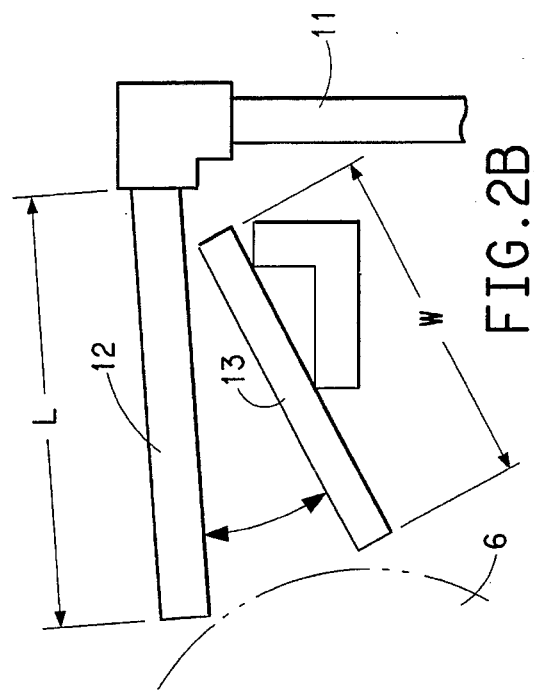
FIG. 2-A is an enlarged view of the foam system shown in FIG. 1.
Figure 2A:
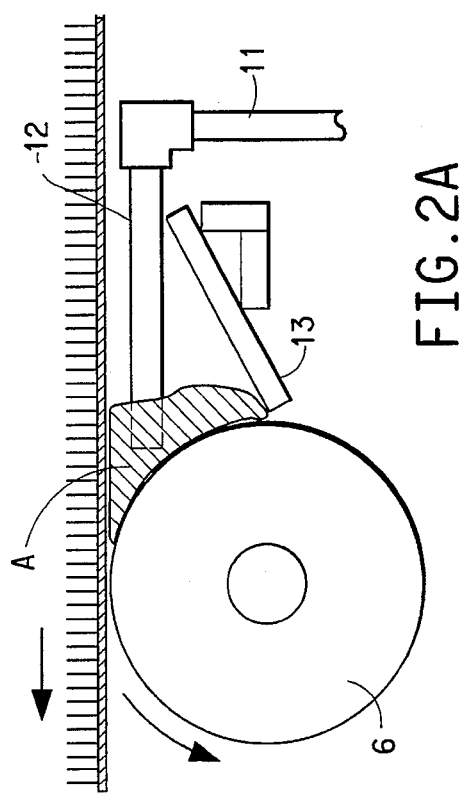

As shown in FIG. 1, one method of foam application involves feeding the carpet (1) on a moving carpet line in such a manner that the face of the carpet, i.e., the pile, is directed upwards and the secondary backing rests on the carpet line, i.e., the tenter frame. The carpet line is located above a rotating lower press roll (6), and the foam system (8) includes a foam manifold connected to a foam generator. Referring to FIG. 2-A, the foam is introduced from the manifold (11) through a foam delivery tube (12) to form a bank of foam in the nip area between the carpet and rotating lower press roll (6). This bank of foam is formed in the triangular-like area marked as (A) in FIG. 2-A, and the foam is applied to the secondary backing by means of the rotating lower press roll and the moving carpet. The foam is effectively applied, because it collapses at the nip point between the lower press roll and secondary backing. A nip slide or dam device (13) may be installed to hold excess foam near the lower press roll, until the foam is picked-up and nipped onto the secondary backing by rotation of the roll through the foam puddle.

The position of the foam delivery tube (12) and the nip slide device (13) in relation to the lower press roll (6) is important. First, the delivery tube should be positioned so that foam is delivered onto the upper sector of the press roll (6), as shown in FIG. 2-A, in order that the foam can be more uniformly nipped onto the secondary backing and that any excess foam will slide downwards along the roll to be collected by the nip slide (13). This is accomplished by having the outlet of the delivery tube extend over the lower press roll as shown in FIG. 2-B. The diameter of the lower press roll is generally in the range of about 6 to 18 inches, and the distance from the outlet of the delivery tube to the press roll should be in the range of about ¼ th to 3 inches. Secondly, the delivery tube (12) should be positioned so that there is no contact between the tube and the carpet. Thus, the delivery tube may be angled downwards as shown in FIG. 2-B. The angle of the delivery tube (to the horizontal) may nominally be in the range of about 10 to 25 degrees. Also, the height of the manifold (11) should be adjusted so that there is no contact between the manifold and the carpet. Thirdly, the nip slide (13) should be positioned so that it will collect any excess foam which falls downward along the upper sector of the press roll (6). Thus, one end of the nip slide (13) is located at about the midpoint of the press roll (6), i.e. the 3:00 position on the face of press roll as shown in FIG. 2-A. The other end of the nip slide (13) is positioned under the inlet portion of the delivery tube (12). Referring to FIG. 2-B, the angle of the nip slide (to the horizontal) may nominally be in the range of about 5 to 45 degrees. As shown in FIG. 2-B, the length (L) of an individual delivery tube should slightly exceed the width (W) of the nip slide in order for the foam to be delivered onto the lower press roll (6). It is recognized that there will be multiple foam delivery tubes in order to uniformly treat the secondary backing. For example, there may be 16 delivery tubes per carpet line for treating carpets having 12 foot widths.

The speed of the rotating lower press roll (6) and the carpet line may be the same or different. The lower press roll can run in the same direction as the carpet or in the reverse direction of the carpet. Typically, the speed of the carpet line is in the range of 20 to 200 feet per minute, and the speed of the nip roll is in the range of 50% to 200% of the speed of the carpet line (reverse direction) or 50% to 300% (same direction).

The amount of repellent finish applied will generally be in the range of about 0.01 to about 20 ounces per square yard of secondary backing and preferably in the range of about 0.2 to about 10 ounces per square yard. Typically, commercially available repellent finishes contain about 0.5 to about 40% by weight total active ingredient. In the case of silicones, the amount of the total active ingredient may be greater than 40% by weight. In this invention, the amount of active ingredient applied will be generally in the range of about 0.01 to about 5.00 ounces per square yard of secondary backing, and approximately the same amounts may be applied in either foam or spray application. Preferably, about 0.05 to about 3.00 ounces of active ingredient per square yard of secondary backing is applied. However, it is understood that the amount of repellent finish and active ingredient applied will be adjusted depending upon the type and concentration of the repellent, amount of fluorochemical (soil resist) on the face fiber, carpet construction, density of carpet face fiber, type of carpet face fiber, tightness or closeness of the secondary backing (woven or non-woven), and the amount and type of latex or other adhesive used. In any event, it is important that a sufficient amount of repellent finish be uniformly applied onto the secondary backing in order that the secondary backing is rendered impervious to liquids in accordance with the testing methods described below.

The present invention is further illustrated by the following examples, but these examples should not be considered as limiting the scope of the invention.

Testing Methods

Staining Test:

Mix 45 grams of a cherry flavored, sugar sweetened, Kool-Aid powder in 500 ml of water. Allow solution to reach room temperature (75±5° F.) before using. Place the carpet sample with the secondary backing touching a white absorbent paper towel or blotter paper. In the case of a unitary backed carpet where there is no secondary backing, place the sample with the adhesive (latex)-coated side touching a white absorbent paper towel or blotter paper. Pour 20 ml of Kool-Aid onto the carpet sample from the face fiber side through a 1½" diameter cylinder from a height of about 6 cm. to create a circular stain. Remove cylinder and mechanically work the solution into the tufts, e.g., by hand, in order to obtain uniform staining. Let the sample stay undisturbed for 30 minutes. Lift the sample at the end of 30 minutes and look for visual red staining on the white absorbent paper. Room temperature water can be substituted for the Kool-Aid solution as a staining liquid. If considerable amount of a staining solution has passed through the carpet sample, a severe staining will be visible. The sample will be termed as substantially impervious if none or a very slight amount of liquid has passed through the carpet sample leaving none or a few visible drops of staining on a white absorbent towel or blotter paper.

Soiling Test:

Carpet samples were installed on a commercially available underlay and were subjected to actual walk-on traffic cycles of about 158,000 foot traffics. The samples were vacuumed daily and at the end of 158,000 cycles, the soiled carpets were commercially cleaned using a hot wet extraction cleaning method with a detergent/water solution. A portion of the soiled sample was left uncleaned for comparison purposes. Cleaned and uncleaned samples were evaluated with a visual rating scale of 1 to 10, where 1= cleaned, unsoiled and 10= heavily soiled.

EXAMPLES

Treatment of Secondary Backings Prior to Latex Curing Oven

Example 1

A 33 oz., cut-pile (about ¾ inch pile height) nylon BCF carpet sample having woven polypropylene primary and secondary backings was used in this example.

An aqueous solution containing 18% by weight of "ZONYL" 1250 fluorochemical solution was mixed with 3 grams per liter of a foaming agent, KAF 300S, available from Peach State Labs. The foamable fluorochemical solution was applied through a foamer at an approximate flow rate of 1 gallon/min with a blow ratio of 19:1 to the underside of the secondary backing. With an estimated wet pick-up of 3–8% (based on a latex coated carpet weight of 32 oz/sq. yd.), this foam process applies about 0.20–0.30 oz. of the "ZONYL" 1250 fluorochemical solution per square yard of secondary backing. The sample was then passed between press (nip) rolls and through a latex curing oven at a dryer speed of 70 feet/min and at an oven temperature of 350° F. to 400° F. to cure the latex and dry the fluorochemical. The fluorochemical treated finished carpet imparted sufficient imperviousness to the secondary backing to pass the Staining Test, whereas an untreated but otherwise identical control sample failed the Staining Test.

Example 2

A residential cut-pile stain resist treated carpet sample (45 oz/sq. yd.) was produced by a conventional mill process and was composed of nylon 6,6 staple face fiber which had been treated with producer-applied fluorochemical (520 ppm fluorine based on weight of fiber), polypropylene primary backing, latex adhesive, and polypropylene secondary backing. Prior to the latex curing oven, the underside of the secondary backing was treated with a foam application of 1 ounce per square yard of an aqueous dispersion containing 44.9% by weight of the fluorochemical "ZONYL G" 17 5% by weight of a wax emulsion "NALAN GN", and 0.3% by weight of the foaming agent "DEXTROL 916". The carpet was oven dried.

A sample from the treated carpet was placed on AATCC blotter paper and was stained with Kool-Aid as described in the Staining Test. The carpet sample was substantially impervious to the Kool-Aid stain. An untreated carpet was placed on AATCC blotter paper and was stained with Kool-Aid as described in the Staining Test. The blotter paper was severely stained by the Kool-Aid.

A sample from the treated carpet was placed on AATCC blotter paper and was stained as described in the Staining Test with the exception that hot coffee (150° F.) was substituted for Kool-Aid as the staining agent. The carpet sample was substantially impervious to the hot coffee stain. An untreated carpet was placed on AATCC blotter paper and was stained as described in the Staining Test with the exception that hot coffee (150° F.) was substituted for Kool-Aid as the staining agent. The blotter paper was severely stained by the coffee.

A sample from the treated carpet was placed on AATCC blotter paper and was stained as described in the Staining Test with the exception that red wine was substituted for Kool-Aid as the staining agent. The carpet sample was substantially impervious to the red wine stain. An untreated carpet was placed on AATCC blotter paper and was stained as described in the Staining Test with the exception that red wine was substituted for Kool-Aid as the staining agent. The blotter paper was severely stained by the red wine.

Example 3

A residential cut-pile stain resist & fluorochemical treated carpet sample (59 oz/sq. yd.) was produced by a conventional mill process and was composed of nylon 6,6 BCF face fiber, polypropylene primary backing, latex adhesive, and polypropylene secondary backing. Prior to the latex curing oven, the underside of the secondary backing was treated with a foam application of 1 ounce per square yard of an aqueous dispersion containing 35% by weight of the wax emulsion "NALAN GN" and 0.3% by weight of the foaming agent "DEXTROL 916". The carpet was oven dried.

A sample from the treated carpet was placed on AATCC blotter paper and was stained with Kool-Aid as described in the Staining Test. The carpet sample was substantially impervious to the Kool-Aid stain. An untreated carpet was placed on AATCC blotter paper and was stained with Kool-Aid as described in the Staining Test. The blotter paper was severely stained by the Kool-Aid.

A sample from the treated carpet was placed on AATCC blotter paper and was stained as described in the Staining Test with the exception that hot coffee (150° F.) was substituted for Kool-Aid as the staining agent. The carpet sample was substantially impervious to the hot coffee stain. An untreated carpet was placed on AATCC blotter paper and was stained as described in the Staining Test with the exception that hot coffee (150° F.) was substituted for Kool-Aid as the staining agent. The blotter paper was severely stained by the coffee.

A sample from the treated carpet was placed on AATCC blotter paper and was stained as described in the Staining Test with the exception that red wine was substituted for Kool-Aid as the staining agent. The carpet sample was substantially impervious to the red wine stain. An untreated carpet was placed on AATCC blotter paper and was stained as described in the Staining Test with the exception that red wine was substituted for Kool-Aid as the staining agent. The blotter paper was severely stained by the red wine.

Treatment of Finished Carpets

Example 4

A finished residential mill carpet sample having nylon 6,6 face fiber (40 oz., cut pile, about ¾ inch pile height), polypropylene primary and secondary backings and a latex adhesive, had sprayed onto the underside of its secondary backing an aqueous solution containing 10 percent by weight of the fluorochemical solution, "TEFLON" MF (available from DuPont Co.) at an approximate 15 weight percent wet pick-up (based on a latex coated carpet weight of 32 oz/sq. yd.) The sample was allowed to dry at room temperature (70±5° F.) for approximately 12 hours. The treated sample was then installed on a commercial underlay, with a white paper towel underneath the secondary backing and then stained on the face fiber with water as described in the above Staining Test. An installed control sample, which was identical in construction to the sample described above, except the underside of its secondary backing was not subjected to fluorochemical treatment, was also tested for staining underneath for comparison. The treated sample did not show any staining on the paper towel after 30 minutes and even after 24 hours, while the paper towel underneath the control carpet was totally soaked with water even after just 2 minutes.

Example 5

A 40 oz. cut pile (about ¾ inch pile height), carpet sample was constructed by tufting nylon 6,6 bulked continuous filament (BCF) yarn into a polypropylene primary backing. The face fiber of the dyed carpet was treated with an acid dye stain resist treatment and with a topical fluorochemical, "ZONYL" 1250 (an anionic urethane type fluorochemical solution available from DuPont Co.), giving an approximate level of 500 ppm of fluorine on the face fiber based on the weight of the fiber. The sample was coated with 33 oz. of a carboxylated styrene-butadiene rubber (SBR) latex adhesive, Type V-9370 available from Colloids, Inc. and a polypropylene secondary backing was applied. This finished carpet sample was then cut into several pieces for treatment with various levels of fluorochemical. Fluorochemical was sprayed onto the underside of the secondary backing, unless otherwise indicated. The fluorochemical, "ZONYL" 1250 was used for this test. For all treated samples, the fluorochemical was dried and the latex was dried and cured in a drying oven at 250° F. for 15 minutes. The carpet samples were brought to room temperature before stain testing. The results of the 30 minute Staining Test are described below in Table 1.

TABLE 1

| Item no. | Fluorine level (oz./sq. yd.) | Fluorochemical Application | Stain Test Results |
|---|---|---|---|
| 2-1 | 0.08* | Underneath SCB*** | Stained |
| 2-2 | 0.15 | " | No stain |
| 2-3 | 0.22 | " | No stain |
| 2-4 | 0.30 | " | No stain |
| 2-5 | 0.37 | " | No stain |
| 2-6 | 500 ppm** | On the face fiber (additional) | Stained |
| 2-7 (control) | None | None | Stained |

*Amount of fluorochemical applied to the underside of the secondary backing based on square yard of secondary backing.
**Amount of fluorochemical applied (ppm), as an additional amount, to the face fiber based on weight of face fiber.
***SCB = secondary backing The results show that sample no. 2-7 (control) and sample no. 2-1, where the fluorochemical treatment was insufficient failed the Staining Test. Also, sample no. 2-6, where an additional amount of 500 ppm of fluorine was applied onto the face fiber but none was applied underneath the secondary backing, failed the Staining Test. These results indicate that the samples must have an adequate fluorochemical treatment underneath the secondary backing and merely applying additional amount of fluorochemical onto the face fiber is not sufficient to pass the Staining Test. All other samples having sufficient fluorine treatment underneath the backing passed the Staining Test.

Example 6

A residential cut-pile stain resist & fluorochemical treated carpet sample was produced by a conventional mill process and was composed of nylon 6,6 BCF face fiber, polypropylene primary backing, latex adhesive, and polypropylene secondary backing. The underside of the finished carpet was treated with a spray application of various repellent finishes which are described below in Table 2. The carpet was oven dried. A sample from the treated carpet was placed on AATCC blotter paper and was stained with Kool-Aid as described in the Staining Test.

TABLE 2

| COMPOSITION OF APPLICATION BATH (IN WATER) | QUANTITY | STAIN RESULT |
| --- | --- | --- |
| 10% OF ZONYL DWR | 2.5 OZ/SQ. YD. | SUBST. IMPER.* |
| 10% OF ZONYL 8070 | 2.5 OZ/SQ. YD. | SUBST. IMPER. |
| 10% OF ZONYL D | 2.5 OZ/SQ. YD. | SUBST. IMPER. |
| 10% OF ZONYL 6991 | 2.5 OZ/SQ. YD. | SUBST. IMPER. |
| 10% OF ZONYL NWG | 2.5 OZ/SQ. YD. | SUBST. IMPER. |
| 10% OF NALAN GN | 2.5 OZ/SQ. YD. | SUBST. IMPER. |
| 10% OF ZONYL PPR | 2.5 OZ/SQ. YD. | SUBST. IMPER. |
| 10% OF 3M FC-393 | 2.5 OZ/SQ. YD. | SUBST. IMPER. |
| 10% OF ICI MILEASE F-14 | 2.5 OZ/SQ. YD. | SUBST. IMPER. |
| 5% OF ZONYL D + 5% OF NALAN GN | 3.0 OZ/SQ. YD. | SUBST. IMPER. |
| 10% OF 3M FC-247 | 3.0 OZ/SQ. YD. | SUBST. IMPER. |
| 50% OF TEFLON AP | 3.0 OZ/SQ. YD. | SUBST. IMPER. |
| 10% OF AEROTEX 96B | 3.0 OZ/SQ. YD. | SUBST. IMPER. |
| PEACH STATE FLUOROGARD FG-07 | 3.0 OZ/SQ. YD. | SUBST. IMPER. |
| 20% OF DOW CORNING C2-0563 | 3.0 OZ/SQ. YD. | SUBST. IMPER. |
| 20% OF AEROTEX 93 | 3.0 OZ/SQ. YD. | SUBST. IMPER. |
| 20% OF NALAN W | 3.0 OZ/SQ. YD. | SUBST. IMPER. |
| 20% OF AUROPEL NSE | 3.0 OZ/SQ. YD. | SUBST. IMPER. |
| 20% OF AEROTEX 96 | 3.0 OZ/SQ. YD. | SUBST. IMPER. |

*the term "SUBST. IMPER." in the above table and the following tables 3 and 4 means substantially impervious.

Example 7

A residential cut-pile stain resist & fluorochemical treated carpet sample was produced by a conventional mill process and was composed of nylon 6,6 BCF face fiber, polypropylene primary backing, latex adhesive, and polypropylene secondary backing. The underside of the finished carpet was treated with a spray application of various repellent finishes which are described below in Table 3. The carpet was air dried.

A sample from the treated carpet was placed on AATCC blotter paper and was stained with Kool-Aid as described in the Staining Test.

TABLE 3

| TREATMENT | QUANTITY | STAIN RESULT |
| --- | --- | --- |
| 50% DISPERSION OF | 3.0 OZ/SQ. YD. | SUBST. IMPER. |

TABLE 3-continued

| TREATMENT | QUANTITY | STAIN RESULT |
| --- | --- | --- |
| TEFLON AP IN WATER | | |
| 3M FABRIC PROTECTOR | 1.0 OZ/SQ. YD. | SUBST. IMPER. |
| THOMPSON'S WATER SEAL AEROSOL | 5.6 OZ/SQ. YD. | SUBST. IMPER. |
| COLORWORKS KRYLON EPOXY AEROSOL | 3.6 OZ/SQ. YD. | SUBST. IMPER. |
| PAM PUMP SPRAY (CANOLA OIL) | 7.8 OZ/SQ. YD. | SUBST. IMPER. |

Example 8

A residential cut-pile stain resist and fluorochemical treated carpet sample was produced by a conventional mill process and was composed of nylon 6,6 BCF face fiber, polypropylene primary backing, latex adhesive, and polypropylene secondary backing. The underside of the finished carpet was treated with a brush coating of various repellent finishes which are described below in Table 4. Water-based coatings were diluted in water to a viscosity of 100 cps prior to application to the carpet. The carpet was air dried.

A sample from the treated carpet was placed on AATCC blotter paper and was stained with Kool-Aid as described in the Staining Test.

TABLE 4

| TREATMENT | QUANTITY (WT. OF COATING AFTER DRYING) | STAIN RESULT |
| --- | --- | --- |
| REG. GEL MATTE FROM GOLDEN ARTIST COLORS | 1.0 OZ/SQ. YD. | SUBST. IMPER. |
| ACRYLIC MATTE MED. FROM GOLDEN ARTIST COLORS | 1.7 OZ/SQ. YD. | SUBST. IMPER. |
| REG. CLEAR GEL GLOSS FROM GOLDEN ARTIST COLORS | 2.4 OZ/SQ. YD. | SUBST. IMPER. |
| ENTERPRISE SILICONIZED WATER SEAL | 1.7 OZ/SQ. YD. | SUBST. IMPER. |

Treatment of Finished Carpets (Improved Soiling Performance)

Example 9

Carpet samples (33 oz., beige colored, cut pile (about ¾ inch pile height, nylon 6,6 BCF) were treated with various levels of "ZONYU" 1250 fluorochemical on the underside of the secondary backings, as described above in Example 5. The treated samples were heat-treated at 250° F. for 15 minutes. A control sample with no fluorochemical applied to the underside of the secondary backing was used for comparison purposes. All samples, including the control, had a topical fluorochemical application on the face fiber (approximately 500 ppm of fluorine based on weight of face fiber) in order to impart soil resistance. The samples were installed on a commercial underlay and were subjected to 158,000 foot-traffics for a Soiling Test. These samples were vacuumed daily for the entire period of the soil test. At the end of 158,000 cycles, a portion of each of the soiled and trafficked carpet samples was cleaned using an anionic/nonionic detergent-water solution in a commercial hot-wet extraction or "steam" cleaning method. The cleaned and uncleaned samples were then visually evaluated for soiling using a rating scale as described in the Soiling Test. The results are described below in Table 5.

TABLE 5

Visual Rating Evaluation for Samples after 158,000 Foot Traffic Cycles

| Sample | Fluorine Level* | Visual Rating Uncleaned | Cleaned |
| --- | --- | --- | --- |
| Control | 0 | 7.5 | 3.5 |
| 3-1 | 0.15 oz/sq. yd. | 7.0 | 3.2 |
| 3-2 | 0.22 oz/sq. yd | 7.0 | 3.2 |
| 3-3 | 0.30 oz/sq. yd | 6.5 | 3.0 |
| 3-4 | 0.37 oz/sq. yd | 6.5 | 3.0 |

*Amount of fluorochemical applied to the underside of the secondary backing based on square yard of secondary backing.

It was quite unexpected that although the fluorochemical treatment was applied to the underside of the secondary backing, the results show that all the test specimens have a better soil rating than that of the control. Samples with higher amount of fluorochemical treatment showed better soiling results in terms of both initial soil rating and also after-cleaning. Generally, a visual rating difference of 0.5 units is discernible to an expert and about a 1 unit difference is noticeable to people who are not that familiar with soil ratings.

Example 10

The control and the treated carpet samples from above Example 9, were placed on a brown, absorbent paper sheet, commercially installed and then cleaned using a truck mounted, hot-wet extraction machine with 12 passes of cleaning and extraction. The samples were removed at the end of the cleaning and observations were made to feel for any dampness on the underneath of the backing and/or any wetness on the brown paper due to cleaning solution passing through the backing. The results showed that the backing was completely dry for all the samples which had fluorochemical applied to the underside of their secondary backing and there were no signs of water on the brown paper underneath the backing. The backing of the control sample was slightly damp and showed multiple droplets of the cleaning solution on the brown paper.

Treatment of Finished Carpet (Unitary Backing)

Example 11

The backing of a 33 oz., cut pile (about ¾ inch pile height) nylon BCF carpet sample, having only a polypropylene primary (unitary) backing, was treated with approximately 32 oz./square yard of a latex adhesive. The underneath of the latex-treated backing was sprayed with a solution containing 10% by weight of "ZONYL" 1250 fluorochemical solution at an approximate wet pick-up of 15 weight % based on a latex coated carpet weight of 32 oz/sq. yd. This unitary backed carpet sample, with no secondary backing, was oven dried at 250° F. for 15 minutes. After being subjected to the Staining Test, the carpet showed no staining underneath the latex-coated side after 30 minutes and even after 24 hours.

Treatment of Secondary Backing (Dipping)

Example 12

This example involves treating the secondary backing with various repellent finishes and then drying the finish before laminating the secondary backing to the primary backing.

A residential cut-pile stain resist & fluorochemical treated carpet sample (40 oz/sq. yd.) was produced by a conventional mill process and was composed of nylon 6,6 BCF face fiber, polypropylene primary backing, and latex adhesive. Prior to laminating the polypropylene secondary backing to the latex coated primary backing, the secondary backing (Patchoge Plymouth #3089 woven polypropylene with 8 picks per inch) was coated with a repellent finish by dipping the secondary backing in the repellent finish and allowing the excess finish to run off. The repellent finish was dried onto the secondary backing in a carpet oven at 250° F. The coated secondary backing was then laminated to the latex coated primary in a conventional manner. The carpet was oven dried.

A sample from the carpet with the coated secondary backing was placed on white absorbent paper towels and was stained with Kool-Aid as described in the Staining Test. The results are reported below in Table 6.

TABLE 6

| Repellent Finish | Active Ingredient Quantity (oz/yd$^2$) | Stain Result |
| --- | --- | --- |
| Zonyl 1250 | <0.1 | Substantially Impervious |
| Zonyl NWG | <0.1 | Substantially Impervious |
| Zonyl G | <0.1 | Substantially Impervious |
| Mixture of 44.9% Zonyl G, 17.5% Nalan GN, 0.3% Mykon NRW-3, 0.2% Arquad 12-37W | 1.0 | Substantially Impervious |

Example 13

This example involves treating the secondary backing with a repellent finish and then laminating the secondary backing to the primary backing before the repellent finish is dried.

A residential cut-pile stain resist & fluorochemical treated carpet sample (40 oz/sq.yd.) was produced by a conventional mill process and was composed of nylon 6,6 BCF face fiber, polypropylene primary backing, and latex adhesive. Prior to laminating the polypropylene secondary backing to the latex coated primary backing, the secondary backing (Patchoge Plymouth #3089 woven polypropylene with 8 picks per inch) was coated with a 4.2% solution of Zonyl 1250 in water by dipping the secondary backing in the water repellent finish and allowing the excess finish to run off. The coated secondary backing was then laminated to the latex coated primary in a conventional manner. The carpet was oven dried.

A sample from the carpet with the Zonyl 1250 coated secondary backing was placed on white absorbent paper towels and was stained with Kool-Aid as described in the Staining Test. The carpet sample was substantially impervious to the Kool-Aid stain.

We claim:

1. A method for constructing a carpet having a secondary backing which is substantially impervious to liquids, comprising the steps of:

a) applying a repellent finish comprising a composition selected from the group consisting of silicones, wax emulsions, and hydrophobic acrylate resins, and mixtures thereof onto the secondary backing of a carpet having a tufted primary backing adhered to the secondary backing, and b) drying the repellent finish onto the secondary backing to render the secondary backing substantially impervious to liquids.

2. The method of claim 1, wherein the repellent finish is a silicone-based composition.

3. The method of claim 1, wherein the repellent finish is a wax emulsion containing about 0.5 to about 40% by weight active ingredient.

4. The method of claim 1, wherein the repellent finish is a hydrophobic acrylate resin containing about 0.5 to about 40% by weight active ingredient.

5. The method of claim 1, wherein the repellent finish is an aqueous blend comprising 1 to 99% by weight fluorochemical dispersion and 99 to 1% by weight wax emulsion based on the total weight of the aqueous blend.

6. The method of claim 1, wherein the secondary backing is a polypropylene material.

7. The method of claim 1, wherein the tufted primary backing comprises tufts of nylon yarns, the secondary backing is a polypropylene material, and the primary backing is adhered to the secondary backing by latex.

8. The method of claim 7, wherein the nylon yarns have been coated with fluorochemical.

9. The method of claim 1, wherein a sufficient amount of repellent finish is applied onto the secondary backing to provide an amount of active ingredient in the range of 0.01 to 5.0 ounces per square yard of secondary backing.

10. The method of claim 1, wherein the repellent finish is dried onto the secondary backing of the carpet by heating the carpet at an oven temperature in the range of 250° to 400° F.

11. The method of claim 1, wherein the repellent finish is dried onto the secondary backing of the carpet at room temperature.

12. A method for constructing a carpet having a secondary backing which is substantially impervious to liquids, comprising the steps of:

a) applying a repellent finish comprising a composition selected from the group consisting of silicones, wax emulsions, and hydrophobic acrylate resins, and mixtures thereof onto a secondary backing material; and b) contacting the secondary backing with an adhesive-coated tufted primary backing to form a carpet having a secondary backing which is substantially impervious to liquids.

13. The method of claim 12, wherein the repellent finish is dried onto the secondary backing prior to contacting the secondary backing with the tufted primary backing.

14. The method of claim 12, wherein the repellent finish is dried onto the secondary backing after contacting the secondary backing with the tufted primary backing.

15. The method of claim 12, wherein the adhesive is latex.

16. A method for applying a repellent finish comprising a composition selected from the group consisting of silicones, wax emulsions, and hydrophobic acrylate resins, and mixtures thereof onto a secondary backing of a carpet, comprising the steps of:

a) feeding a carpet comprising a secondary backing and a tufted primary backing on a moving carpet line located above the rotating press roll and a foam delivery tube, wherein the carpet faces upwards such that the secondary backing is positioned on the carpet line and the foam delivery tube is not in contact with the secondary backing;

b) introducing the repellent finish in the form of foam through the foam delivery tube to form a bank of foam between the rotating press roll and moving carpet; and c) contacting the secondary backing with the foam repellent finish.

17. The method of claim 16, wherein the rotating press roll and the carpet line move at the same speed.

18. The method of claim 16, wherein the rotating press roll and the carpet line move at different speeds.

19. The method of claim 16, wherein a second rotating press roll is in contact with the face of the carpet.

20. The method of claim 16, wherein a nip slide device is positioned at an angle below the foam delivery tube to collect any excess foam from the bank of foam along the rotating press roll.

21. A carpet having a secondary backing substantially impervious to liquids, comprising a tufted primary backing adhered to a secondary backing coated with a sufficient amount of dried repellent finish comprising a composition selected from the group consisting of silicones, wax emulsions, and hydrophobic acrylate resins, and mixtures thereof to render the secondary backing substantially impervious to liquids.

22. The carpet of claim 21, wherein the tufted primary backing comprises tufts of nylon yarns, the secondary backing is a polypropylene material, and the primary backing is adhered to the secondary backing by latex.

23. The carpet of claim 22, wherein the nylon yarns have been coated with fluorochemical repellent finish.

24. The carpet of claim 23, wherein the repellent finish is an aqueous blend comprising 1 to 99% by weight fluorochemical dispersion and 99 to 1% by weight wax emulsion based on the total weight of the aqueous blend.

* * * * *